3,274,243
PREPARATION OF ALKANOIC THIOAMIDES
Everett E. Gilbert, Morris Township, Morris County, and Edmund J. Rumanowski, Jersey City, N.J., assignors to Allied Chemical Corporation, New York, N.Y., a corporation of New York
No Drawing. Filed Feb. 7, 1963, Ser. No. 256,824
3 Claims. (Cl. 260—551)

This invention relates to the preparation of alkanoic thioamides. More particularly, this invention relates to the preparation of alkanoic thioamides from alkyl nitriles and hydrogen sulfide.

The preparation of aromatic thioamides by the reaction of an aromatic nitrile with hydrogen sulfide in the presence of a base much such as triethylamine is known; the reaction is largely complete in 2–4 hours at room temperature and gives good yields. On the other hand, the preparation of the alkanoic thioamides, subject of this invention, by this same general process proceeds very sluggishly, and the yields thereby obtained are insufficient to make this process commercially suitable. The sluggishness of this reaction is still observed even upon the employment of excess hydrogen sulfide and superatmospheric pressures, the reaction requiring periods such as 12 hours to afford good yields. Since this process is characterized by a poor conversion rate of the alkyl nitrile to the corresponding thioamide, products obtained by this reaction have been available only at a relatively high cost.

It is an object of this invention, therefore, to provide a process for the preparation of alkanoic thioamides wherein good yields of thioamide are produced. Another object of this invention is to provide a process for producing alkanoic thioamides wherein the conversion rate of alkyl nitrile to the corresponding thioamide is substantially greater than that heretofore available. A further object of this invention is to provide a process wherein pure, stable, thioamides are produced from aliphatic nitriles. Still another object of this invention is to provide a process for synthesizing alkanoic thioamides without the employment of superatmospheric pressure, extended reaction periods or excess hydrogen sulfide. A still further object of this invention is to provide such a process which is industrially suitable and wherein the cost of the alkanoic thioamide can be substantially decreased from present levels due to process efficiency and high reactant conversion rates. Other objects and advantages will become more apparent from the following more complete description and claims.

This invention contemplates an improvement in the process for the production of alkanoic thioamides wherein hydrogen sulfide is added to an alkanoic mononitrile which comprises employing in the reaction mixture at least one strongly basic amine of the group consisting of secondary amines, quaternary ammonium hydroxides, and tetraalkyl guanidines, said amine being employed in at least about 1:10 molecular proportions of amine:nitrile employed in the reaction mixture whereby the amine–$H_2S$ salt is provided in the reaction mixture in at least 1:10 molecular proportions with the nitrile therein upon including hydrogen sulfide in the reaction mixture; maintaining temperatures in the range of 35° C.–reflux and about atmospheric pressures; and terminating the reaction in not over 8 hours.

Preferred reaction temperatures are 50° C.–reflux temperature, and preferred reaction times are not over 6 hours. Preferred amines are di-lower alkyl amines especially diethylamine; tetramethylguanidine; or benzyltrimethyl ammonium hydroxide or a polymer in which the backbone is polyvinyl and the substituents are benzyltrimethyl ammonium hydroxide. The term "strongly basic amine," as used herein, contemplates those amines having a $pK_a$ value in an aqueous solution at 25° C. of at least 8.0.

In one preferred embodiment of this invention the alkanoic mono-nitrile contains from 2 to 4 carbon atoms, and is initially present in the reaction mixture in at least 2:1 mol ratio with the amine initially present thereby providing a reaction medium or solvent.

In a second preferred embodiment of this invention the nitrile contains from about 8 to about 18 carbon atoms and dimethylformamide is present as the reaction solvent.

In obtaining the reaction product of the process of this invention it is desired that the amine and any unreacted nitrile be separated from the alkanoic thioamide without undue delay, i.e. within 24 hours and that the isolated product be triturated with a low boiling partially chlorinated hydrocarbon solvent such as methylene chloride or chloroform. This trituation has been found to be of significant value in recovering a product free from any tendency to decompose into nitrile and $H_2S$.

The term "di(lower alkyl) amines," as used herein, contemplates amines such as diethylamine, di(sec butyl) amine, di(n-propyl) amine, di (isopropyl) amine and the like wherein the alkyl group has from 1 to 4 carbon atoms in its chain. The term "saturated cyclic secondary amines" contemplates compounds such as pyrrolidine and piperidine. In this regard we have found that pyridine, an unsaturated cyclic secondary amine, is not suitable as a catalyst in the process of this invention. The term "quaternary ammonium hydroxides" includes compounds such as benzyltrimethyl ammonium hydroxide and the like while the term "tetraalkylguanidine" contemplates compounds such as tetramethylguanidine which is a tetra-(lower alkyl)-guanidine, one of the preferred strongly basic amines.

In order to more readily illustrate the reaction of this invention, the following equation is set forth:

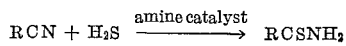

$$RCN + H_2S \xrightarrow{\text{amine catalyst}} RCSNH_2$$

We have found that by using stoichiometric amounts of amine in relation to the amount of hydrogen sulfide present in our reaction that yields as high as 90% and more of the alkanoic thioamide based on the mols of amine-$H_2S$ salt which can be formed, can readily be accomplished without employing pressure or extended reaction periods. We have further discovered that a mol ratio of amine-$H_2S$ salt:nitrile not less than 1:10 will assure excellent yields of thioamide together with a high conversion rate. When carrying out the reaction with 2–4 carbon alkanoic nitriles we prefer that the mol ratio of nitriles:amine-$H_2S$ salt be between about 2:1 and 3.5:1.

The duration of the reaction, i.e. the time of addition of the $H_2S$ gas into the system plus any time allotted for further reaction in the reaction vessel (digestion time) is critical for good yields. If the reaction is permitted to extend beyond a period of about 8 hours under our conditions, the thioamide produced will at least partially revert to nitrile and hydrogen sulfide thereby considerably decreasing the thioamide yield. This phenomenon will occur notwithstanding the presence of the proper mol ratio of amine $H_2S$ salt:nitrile in the system and even if the amine employed is one of those preferred in our process.

In our process we preferably add the $H_2S$ gas into the system at a rapid rate and allow the solution to digest over a period of hours, but, as indicated above, we maintain the total reaction time at 8 hours or less. Our process may, however, be performed without the use of a digestion period, i.e. by adding the hydrogen sulfide into the system at a relatively slow rate over a period of a number of hours but always maintaining a reaction time not in excess of the 8 hour maximum limit. In such a case, no digestion is required and the yield will be equally excellent.

It is theorized that in our system when the hydrogen sulfide enters the system it reacts with the amine to form a complex salt. This salt, in turn, reacts with the nitrile forming the corresponding thioamide and regenerating the amine, which can be largely recovered at the termination of the reaction period.

We have found that the recovery of the thioamide produced should be such that prolonged heating of the product in the presence of catalyst is avoided. For instance, if the recovery is to be by distilling off the compounds of the reaction mixture, it is preferred that the distilling be performed rapidly so that the catalyst and excess nitrile will be rapidly distilled from the distillation vessel leaving the reaction product in the vessel. In commercial practice, it is preferred to isolate the thioamide by flash vaporization thereby removing unreacted nitrile almost instantaneously and avoid extended heating of the thioamide. If distillation is performed with prolonged heating, the reaction product will tend to revert to the corresponding alkanoic mono-nitrile and $H_2S$ gas. Accordingly, one may prefer to distill off aliquots of the reaction mixture so that distillation of any one portion is accomplished within a short span of time thus removing the opportunity for decomposition by extended heating of large batches of the reaction product.

In working up the reaction mixture, we have found that separation by rapid distillation or otherwise should be accomplished preferably within 24 hours after the reaction has been performed. Failure to separate the reaction product within about a day after the process has been completed may cause a decrease in yield relative to that obtainable if the separation had been performed according to these teachings.

In the purification of the thioamide, we have also discovered that purification of the reaction product can be accomplished by trituration of the product with a low boiling partially chlorinated hydrocarbon such as methylene chloride or chloroform. These purification agents remove trace amounts of catalyst physically retained by the reaction product. This purification of the reaction product is preferred because the presence of unremoved basic amine tends to decompose the reaction product into the corresponding nitrile reactant and hydrogen sulfide.

The presence of water or water vapor in substantial quantities has a serious detrimental effect upon the process of our invention and inclusion of water or its vapor into the reaction system is to be avoided. However, while the presence of water is detrimental, our process, surprisingly, does not necessitate any special procedures for the avoidance of the presence of water. This we consider to be particularly unexpected since the prior art recommends strictly anhydrous conditions and reaction vessels in order to improve the product yield.

Since our reaction is operated at atmospheric pressure, no special reaction vessel such as an autoclave need be employed. Since the process is performed at moderately elevated temperatures, it is preferred that the reaction vessel be fitted for refluxing to prevent the boiling off of constituents of the reaction mixture.

Except in the case of high boiling nitriles, our reaction obviates the necessity for the employment of any extraneous solvent or the like. Excess nitrile, we have discovered, acts as the solvent for the reaction thereby eliminating needless cost for suitable solvents and the necessity for employing extra procedures for their separation. Reaction solvents which may be used in our process include, in particular, dimethylformamide. In the case where dimethylformamide is employed as a solvent, separation of the reaction product may be obtained readily by water drowning the entire reaction mixture for recovery of the water-insoluble thioamide product and unreacted nitrile and dissolving the unreacted nitrile in a solvent in which the thioamide is insoluble.

In order to more fully illustrate the nature of this invention and the manner of practicing the same, the following examples are presented. In these examples, all percentages of yield of thioamide produced are percentages of theory based on the mols of amine or $H_2S$ supplied, whichever is below specified. Furthermore, all weight is in grams and temperature is in degrees centigrade unless they are indicated to be otherwise.

Example 1

287.4 grams (7.0 mols) of acetonitrile were placed in a three necked laboratory flask equipped with a gas inlet tube, stirrer, thermometer, reflux condenser and external cooling means. The flask also contained 153.6 grams (2.1 mols) of diethylamine. 172 grams (5.1 mols) of hydrogen sulfide gas were bubbled into the system slowly over a period of seven hours. The temperature of the system was maintained between 52° and 56° C. by the application of external cooling to hold the temperature in that range.

The thioacetamide so synthesized was isolated by evaporating the excess nitrile and amine from small aliquots of product (122 grams) on a steam bath in an air stream. The product thus obtained was somewhat impure, melting at 105°–110° C. 289 grams were isolated with a yield of 77% based on the mols of $H_2S$ employed.

Example 2

The procedure of Example 1 was repeated except that only 123 grams (3.0) mols of nitrile, 109.5 (1.5 mols) of diethylamine and 75.5 grams (2.2 mols) of $H_2S$ were used. The temperature of the system was maintained between 52° and 54° C. during the seven hour addition of the hydrogen sulfide. A yield of 80% of thiacetamide, based on amine, or 55% based on $H_2S$ was isolated as in Example 1.

Example 3

The procedure of Example 1 was modified by using only 78 grams of $H_2S$ representing 2.3 mols; and by bubbling all the $H_2S$ into the system over a period of 1.3 hours, while the system was maintained at a temperature between 50° and 54° C. The system was then heated or digested for 3.5 hours at a temperature about 55°–56° C., and for one further hour at 50° C.

A yield of 181 grams of thioamide was isolated by the procedure of Example 1, representing about 100% of theory yield based on the mols of $H_2S$ and upon the mols of amine employed.

Example 4

287.4 grams (7 mols) of acetonitrile were charged into a three necked laboratory flask together with 153.6 grams (2.1 mols) of diethylamine. The laboratory flask was equipped with a gas inlet tube, stirrer, thermometer, reflux condenser and external cooling means. 60 grams (1.8 mols) of hydrogen sulfide were bubbled in with stirring and external cooling to hold the temperature at about 50° C. during formation of the diethylammonium sulfide salt. The addition time of the hydrogen sulfide to the system was 0.5 hours and the temperature ranged between 47° and 53° C. The system was heated or digested at temperatures between 55° and 56° C. for one hour and for an additional two hours at temperatures of between 60° and 62° C. During digestion the salt reacted with the nitrile to form the thioamide and regenerated diethylamine. Amine and unreacted nitrile were then recovered by distillation with results as follows:

|  | Grams |
|---|---|
| Distillate | 314 |
| Residue (crude thioamide) | 143 |
| Total | 457 |

Recovered amine was determined by titration of an aliquot of the distillate; 75% of input amine was found to have been recovered. The crude thioamide was then triturated with three successive 200 ml. portions of methylene chloride at room temperature. This gave 94 grams of thioacetamide representing a reaction efficiency of 62% based on the amine employed and 72% based on the amount of $H_2S$ used. The melting point of the product was found to be 111° to 113.5° C.

*Examples 5 to 9*

In the manner of the above examples and especially as in Example 4 acetonitrile can be reacted with $H_2S$ at atmospheric pressure using any of the following strongly basic amines; the saturated cyclic secondary amine, pyrrolidone, the quaternary ammonium hydroxide, benzyltrimethylammonium hydroxide, the polymer in which the backbone is polyvinyl and the substituents are benzyltrimethylammonium hydroxide, namely that compound representable by the formula:

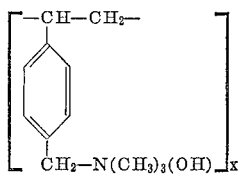

which is marketed under the trademark Dowex 1 x 4 (OH form); the tetraalkyl guanidine, tetramethylguanidine; or the di-(lower alkyl) amine, di(sec-butyl) amine. Each of these amines, we have found, is suitable for use in our process.

*Example 10*

165.3 grams (3.0 mols) of propionitrile were placed in a vessel containing 65.6 grams (0.9 mol) of diethylamine. 27 grams (0.8 mol) of $H_2S$ were passed into the reaction vessel maintained at atmospheric pressure over a period of 0.4 hour at temperatures ranging from 49° to 53° C. The reaction mixture was permitted to digest over a period of one hour at temperatures from 54° to 56° C. and for two hours at temperatures between 60° and 62° C. The thioamide was isloated by evaporating the reaction mixture on a steam bath together with air blowing. The yield of product of melting point 40–43° C. was 51 grams or 71% of theory based on the mols of $H_2S$ employed and 63 mol percent on the mols of amine employed.

*Example 11*

In the manner of Example 10, 138.2 grams (2.0 mols) of isobutyronitrile were reacted with 17 grams (0.5 mol) of $H_2S$ in the presence of 43.9 grams (0.6) of diethylamine. The addition time of the $H_2S$ to the reaction vessel was 0.4 hour at temperatures between 49° and 53° C. The reaction mixture was heated or digested for a period of one hour at a temperature between 50° and 53° C. and for an additional period of 2.5 hours at temperatures between 60° and 62° C.

The thioamide so synthesized was isolated by distillation using a vacuum pump up to a pressure of 100 mm. Hg at 80° C. until there was 50–100 ml. residue. This was chilled by use of Dry Ice and acetone and the residue was filtered. The precipitate obtained was triturated with hexane and dried. The yield of isobutyrothioamide melting at 45°–48° C. was 28 grams or 54% of theory based on $H_2S$ employed. The compound synthesized, isobutyrothioamide, is a new compound heretofore never prepared, so far as we are aware.

*Example 12*

Stearonitrile (0.3 mol) was reacted with 0.29 mol of $H_2S$ in the presence of 0.33 mol, i.e. about 10 mol percent excess of diethylamine and in the presence of 100 grams of dimethylformamide. The $H_2S$ was added to the reaction mixture over a period of 15 minutes at 48°–53° C. The reaction mixture was permitted to digest for one hour at temperatures at about 55°–56° C. and for four hours at temperatures between 60° and 62° C.

The product was recovered by water-drowning (i.e. adding all of the reaction mixture quickly to 500 mls. of water) filtering, and separating unreacted nitrile and thioamide by triturating the precipitate three times with 400 ml. portions of hexane, thereby dissolving the unreacted nitrile. The yield was 45 grams or 52% of theory based on the mols of $H_2S$ stearothioamide melting at 96°–97° C. This example indicates that the excellent conversion rate of nitrile to thioamide can be obtained when long chain alkyl nitriles are reacted according to this invention. Specifically we have found that other high boiling alkyl nitriles can be reacted in the manner of this example, namely lauronitrile and myristonitrile.

COMPARATIVE TEST 1

In the manner of Example 3, 143.7 grams (3.5 mols) of acetonitrile were reacted with 38 grams (1.12 mols) of hydrogen sulfide in the presence of 76.8 grams (1.05 mols) of diethylamine. The addition time to effect salt formation was 1 hour at 47° to 51° C. The reaction mixture was permitted to digest for an additional eleven hours at temperatures of about 50° C. The thioamide was isolated as in Example 4. The yield of thioamide was 35 grams or about 45% based on the amount of amine catalyst employed. Failure to synthesize a substantial yield of thioamide by this procedure was found to be attributable to the extended reaction time, i.e. 12 hours. Accordingly, it was concluded that long periods of heating such as in this example seriously reduce the yield of thioamide as prepared by our process.

COMPARATIVE TEST II 29 grams (0.7 mols) of acetonitrile were placed in a 250 ml. pear shaped three-necked flask equipped with a stirrer and gas inlet. One gram (0.014 mol) of diethylamine was placed in the flask and $H_2S$ gas was continuously passed into the system in slight molar excess over the nitrile used, over a period of 7 hours. The system was maintained at temperatures from about 55° C. to about 60° C. It was observed that an extremely poor yield of thioacetamide was produced. The poor yield is attributed to a mol ratio of amine; $H_2S$ salt:nitrile well below the minimum of 1:10 used in our process.

It is readily seen from the foregoing that the process of this invention provides an economical method for producing alkanoic thioamides. This process enables the operator to produce a substantial yield of thioamide in a short period of time without the employment of pressure, excess hydrogen sulfide or the like. This process further provides a substantially pure product free from any tendency to revert to nitrile and hydrogen sulfide. Accordingly, the instant invention provides the first commercially acceptable method for producing alkanoic thioamides thereby enabling this product to be marketed at substantially decreased prices from present levels.

While certain embodiments of this invention have been described herein in detail, these are only for purposes of illustrating the teachings of this invention and are not to be construed as limitative since certain variations or departures from this disclosure will be obvious to one skilled in the art.

We claim:

1. A process for preparing an alkanoic monothioamide which comprises adding $H_2S$ to an alkanoic mononitrile while employing in the reaction mixture tetramethylguanidine, said tetramethylguanidine being employed in at least about 1:10 molecular proportions of amine:nitrile employed in the reaction mixture whereby the amine-$H_2S$ salt is provided in the reaction mixture in at least 1:10 molecular proportions with the nitrile therein upon including $H_2S$ in the reaction mixture; maintaining temperatures in the range of 35° C. to reflux and about atmospheric pressures; and terminating the reaction in not over 8 hours.

2. A process for preparing an alkanoic monothioamide which comprises adding $H_2S$ to an alkanoic mononitrile while employing in the reaction mixture benzyltrimethyl ammonium hydroxide, said benzyltrimethyl ammonium hydroxide being employed in at least about 1:10 molecular proportions of amine:nitrile employed in the reaction mixture whereby the amine-$H_2S$ salt is provided in the reaction mixture in at least 1:10 molecular proportions with the nitrile therein upon including $H_2S$ in the reaction mixture; maintaining temperatures in the range of 35° C. to reflux and about atmospheric pressures; and terminating the reaction in not over 8 hours.

3. A process for preparing an alkanoic monothioamide which comprises adding $H_2S$ to an alkanoic mononitrile while employing in the reaction mixture a polymer in which the backbone is polyvinyl and the substituents are benzyltrimethyl ammonium hydroxide, said polymer being employed in at least about 1:10 molecular proportions of amine:nitrile employed in the reaction mixture whereby the amine-$H_2S$ salt is provided in the reaction mixture in at least 1:10 molecular proportions with the nitrile therein upon including $H_2S$ in the reaction mixture; maintaining temperatures in the range of 35° C. to reflux and about atmospheric pressures; and terminating the reaction in not over 8 hours.

References Cited by the Examiner

FOREIGN PATENTS 333,508  12/1958  Switzerland.

OTHER REFERENCES

Beilstein, "Handbuch der Organischen Chemie," vol. 2, 2nd Supp., p. 257 (1942).
Dahlbom, Acta Chem. Scand., vol. 5, pp. 690–698 (1951).
Gershbein et al., J.A.C.S., vol. 69, pp. 241–242 (1947).
Houben-Weyl, "Methoden der Organischen Chemie," vol. 9, pp. 762–3 (1956).
Menasse et al., Helv. Chim. Acta, vol. 40, p. 554 (1957).
Pesina, C.A., vol. 34, pp. 425–426 (1940).
Schultz et al., Arch. Pharm., vol. 294, pp. 82–89 (1961).
Traupel et al., Helv. Chim. Acta, vol. 33, p. 1960 (1950).

CHARLES B. PARKER, *Primary Examiner.*

FLOYD D. HIGEL, *Assistant Examiner.*